United States Patent [19]

Yagi et al.

[11] 4,317,438
[45] Mar. 2, 1982

[54] HIGH POWER OUTPUT ENGINE

[75] Inventors: Shizuo Yagi, Asaka; Junji Otani, Omiya; Yasuo Ikenoya, Kawagoe; Hiroshi Kogure, Tokorozawa, all of Japan

[73] Assignee: Honda Giken Kogyo Kabushiki Kaisha, Tokyo, Japan

[21] Appl. No.: 81,152

[22] Filed: Oct. 2, 1979

[30] Foreign Application Priority Data

Oct. 6, 1978 [JP] Japan .................. 53-123341

[51] Int. Cl.³ .............................. F02M 13/06
[52] U.S. Cl. ........................ 123/432; 123/308
[58] Field of Search ............... 123/308, 309, 432

[56] References Cited

U.S. PATENT DOCUMENTS

| 3,416,502 | 12/1968 | Weiss ........................ 123/432 |
| 3,556,060 | 1/1971 | Biabaud ..................... 123/432 |
| 4,186,706 | 2/1980 | Matsumoto ................ 123/432 |
| 4,211,189 | 7/1980 | Hamai ....................... 123/309 |

FOREIGN PATENT DOCUMENTS 1225060 6/1960 France .

Primary Examiner—Ronald H. Lazarus
Attorney, Agent, or Firm—Lyon & Lyon

[57] ABSTRACT

A high power output internal combustion piston engine is provided with two intake ports and one exhaust port for each combustion chamber. Flow through each port is controlled by a valve, the exhaust valve being positioned on one side of the combustion chamber and the two intake valves on the other side. A spark plug communicates with the combustion chamber on the same side as the exhaust valve, and near one of the intake valves. An air-fuel mixture is supplied to each of the intake ports through first and second throttle valves. Means including a lost-motion connection coordinates the movements of the throttle valves.

14 Claims, 12 Drawing Figures

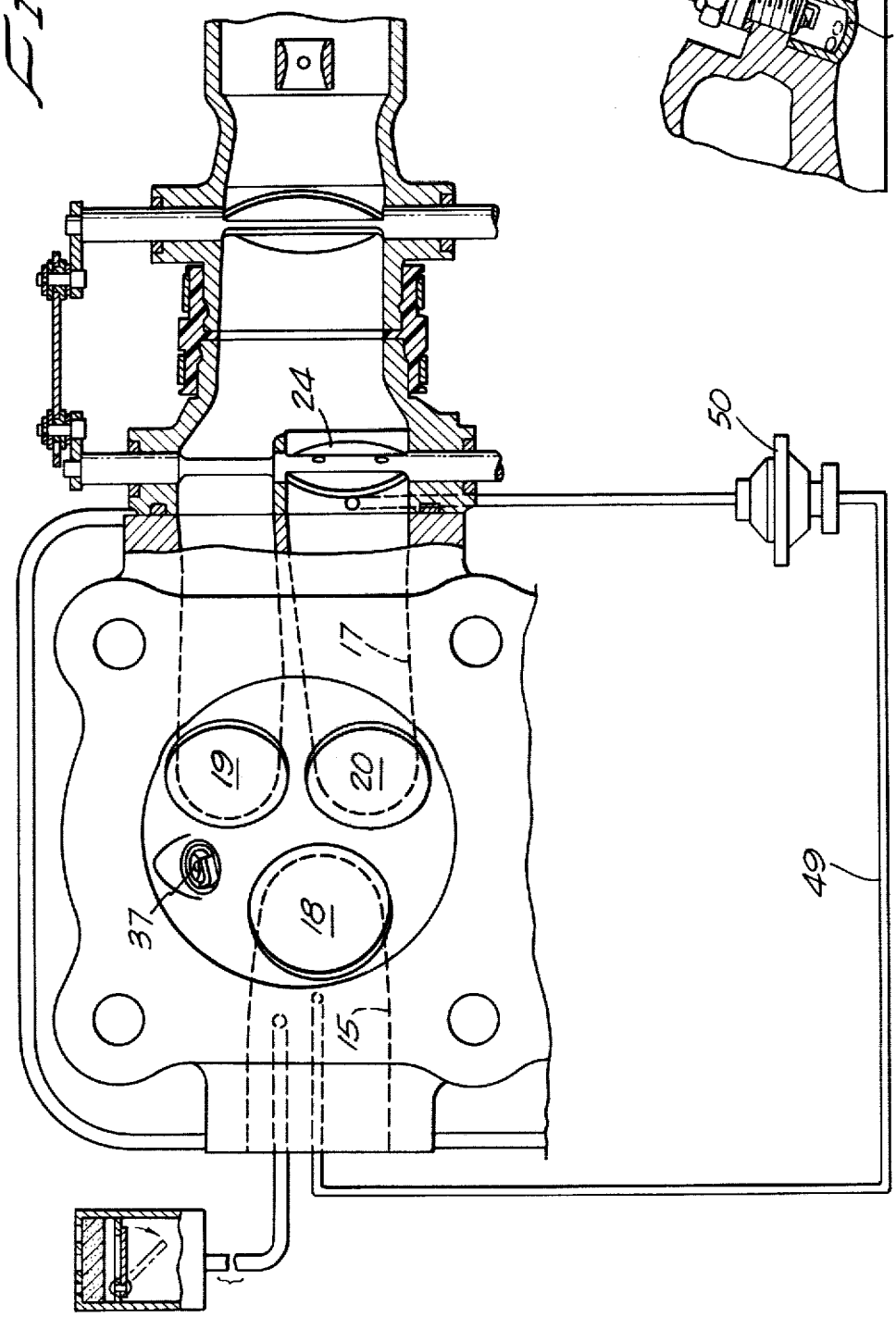

HIGH POWER OUTPUT ENGINE

This invention relates to internal combustion engines of high power output type, and particularly suitable for use in automobiles. Each combustion chamber is provided with a pair of intake valves.

Normally, in engines of this type the effective valve opening area per engine cylinder volume can be made larger, whereby the volumetric efficiency, particularly in the range of high load, is improved to increase the power output. Consequently, the engine weight per unit output becomes smaller, theoretically enabling the fuel consumption to be reduced, and control of exhaust gases to be advantageous as compared with engines having a single intake valve. However, in case of automotive engines, for instance, the engine is operated under a wide range of load conditions, and in the range of relatively low load, because the amount of air intake is small, that is, the ratio of the amount of residual gas in the cylinder to the amount of a charge of fresh air is relatively high, the ignition becomes unstable and the combustion efficiency is lowered. It may permit a relatively large amount of unburned hydrocarbons to be discharged. In the past, in order to eliminate such features, means to improve the combustion by increasing turbulence in the combustion chamber have been proposed such that the intake passage is of spiral form, or vanes are formed on the intake valve, for instance. Such arrangements, however, particularly in the range of high loads, become themselves an intake resistance to hinder the power output, thus being inadequate for engines intended for high power output.

A principal object of the present invention is to provide an engine which is free of such disadvantages, that is, an engine of the high power output type which reduces harmful components in the exhaust gases and improves the fuel consumption. The combustion chamber associated with each cylinder has an exhaust port on one side connected to an exhaust passage and controlled by an exhaust valve, and the combustion chamber also has first and second intake ports on the other side controlled by first and second intake valves, respectively. The first and second intake ports receive an air-fuel mixture from one or more carburetors or other mixture supply source. A spark plug communicates with the combustion chamber and is positioned on the side with the exhaust valve and near the first intake valve. A first throttle valve is located upstream of both intake ports, and the second throttle valve controls flow only through the second intake port. An accelerator pedal or other accelerator operating element is connected to the first throttle valve, and linkage connects the second throttle valve to the first throttle valve so that the second throttle valve opens after the first throttle valve opens. The first intake valve port enters the combustion chamber with a tangential component of the cylinder so as to form a mixture swirl in the combustion chamber.

Other and more detailed objects and advantages will appear hereinafter.

In the drawings:

FIG. 11 is a fragmentary sectional view showing the mounting of the spark plug device shown in FIG. 10.

FIG. 12 is a bottom plan view partly broken away and partly in section, showing a sixth modification.

Figure 1:
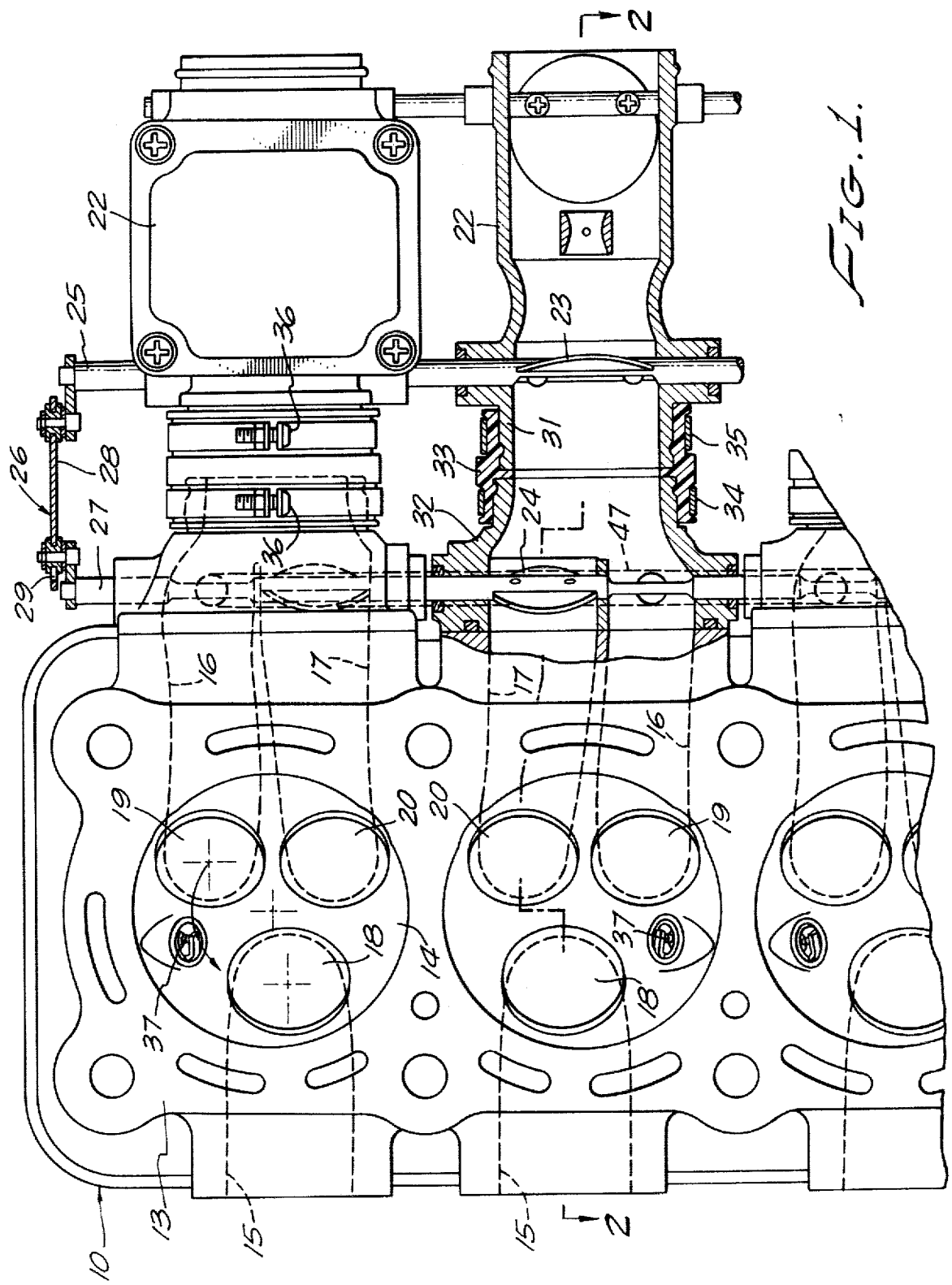
FIG. 1 is a bottom plan view partly broken away and partly in section, showing a preferred embodiment of this invention.
Figure 2:
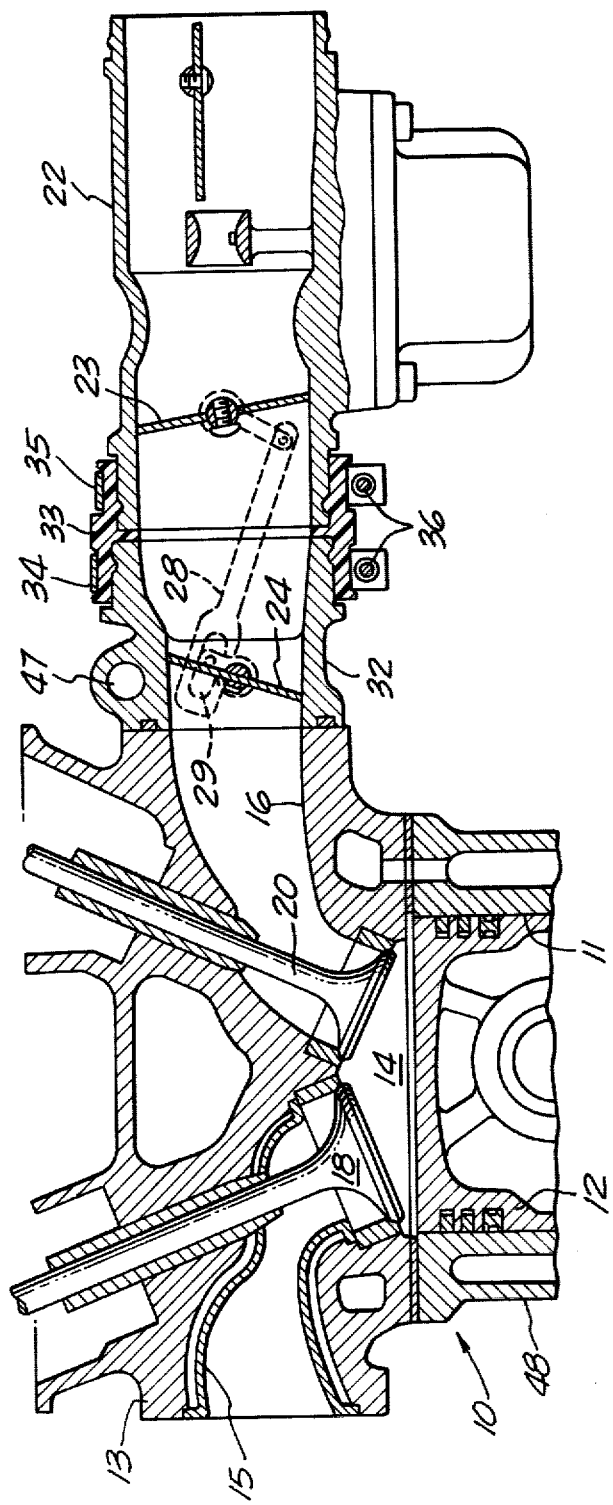
FIG. 2 is a sectional elevation taken substantially of the lines 2—2 as shown in FIG. 1.
Figure 3:
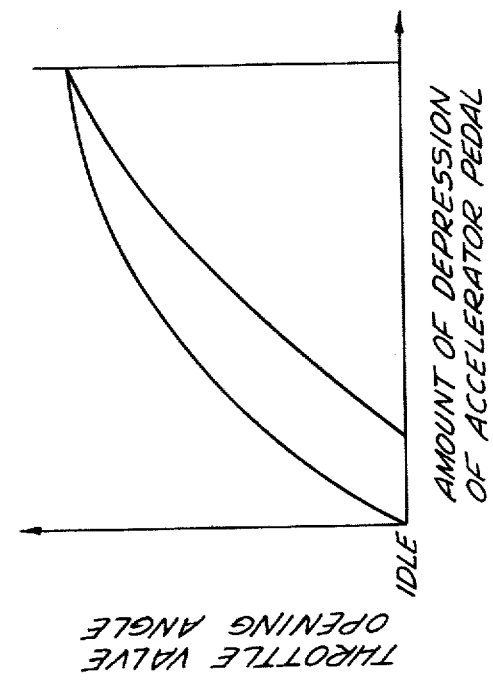
FIG. 3 is a schematic diagram showing valve opening characteristics of the first and second throttle valves.

Referring to the drawings, and particularly to the preferred embodiment as shown in FIGS. 1 and 2, the engine generally designated 10 is of the multi-cylinder type having a plurality of cylinders 11 each provided with a reciprocating piston 12. The engine 10 includes a cylinder head 13 which cooperates with each of the cylinders 11 and pistons 12 to form a combustion chamber 14. An exhaust port 15 in the cylinder head 13 communicates with the combustion chamber 14 on one side thereof, and on the other side a first intake port 16 and a second intake port 17 communicate with the combustion chamber 14. An exhaust valve 18 controls flow through exhaust port 15, and first and second intake valves 19 and 20 control flow through the intake ports 16 and 17, respectively.

A separate carburetor 22 is provided for each cylinder of the engine 10 and the carburetor is provided with a first throttle valve 23 upstream from both intake ports 16 and 17. A second throttle valve 24 controls flow through the second intake port 17. The first throttle valve shaft 25 is connected to an accelerator pedal, not shown, and is connected through linkage 26 to the second throttle valve shaft 27. The link 28 having a slot 29 provides a lost-motion connection between the first throttle valve 23 and the second throttle valve 24.

The first throttle valve shaft 25 is mounted to turn on a stationary tubular portion 31 of the carburetor 22. The second throttle valve shaft 27 is mounted to turn on the intake pipe 32 fixed to the cylinder head 13. The cross section shape of the passage, in which the secondary throttle valve is mounted, is formed as a circle. The non-metallic sleeve 33 telescopically receives adjacent aligned portions of the parts 31 and 32, and the encircling metal bands 34 and 35 may be tightened by the threaded elements 36 to complete the connection between the parts 31 and 32.

As shown in FIG. 1, the spark plug 37 is located on the same side of the combustion chamber 14 as the exhaust valve 18 and is positioned near the first intake valve 19 in line with the swirl indicated by the arrow 38.

Even in closed position, the throttle valves 23 permits sufficient flow of air-fuel mixture through the first intake port 16 to operate the engine at idle speed. During the operation of the preferred form of the invention shown in FIGS. 1 and 2, and in the low load range of the engine, the first throttle valve 23 is opened by means of the accelerator, not shown, and during the intake stroke of the engine an air-fuel mixture is introduced into the combustion chamber 14 by way of the first intake port 16 and first intake valve 19, the second intake port 17 remaining closed. The intake speed of the mixture increases to improve the mixture quality and the mixture passes into the combustion chamber 14 in a tangential direction to cause a rapid turning flow or swirl. At the end of the compression stroke of the piston 12, ignition by the spark plug 37 takes place and a flame nucleus produced thereby is carried by the swirling motion toward the exhaust valve port 15 to contact the exhaust valve 18. In association with the activation of gas by high temperature around exhaust valve 18, the growth of the flame nucleus is accelerated to turn into a strong flame. By the strong flame and swirl effect, the combustion is remarkably improved, and unburned hydrocarbons in the quenching layer adjacent the walls of the cylinder 11 are peeled off by said swirl and also made to burn. Thus, the engine burns the intake mixture uniformly even in the range of low load.

Next, considering the range of relatively high load, operation of the accelerator causes the first throttle shaft 25 to turn the second throttle shaft 27 through the linkage 26 so the air-fuel mixture is also delivered through the second intake port 17 and valve 20. But the rate of intake flow of mixture through the first intake port 16 does not increase beyond the requirement to effectuate an adequate control of swirl in proportion to the load, and to continue desirable combustion as well.

A more detailed description follows. In accordance with the present invention, unburned hydrocarbons HC and oxides of nitrogen $NO_x$ in the exhaust gas are reduced especially in the low load range of the engine, and the indicated specific fuel consumption is improved, in which the following conditions are particularly important:

(a) The intake speed of the air-fuel mixture is increased;

(b) A swirl is produced in the combustion chamber; and (c) A flame nucleus immediately after ignition is caused to grow rapidly.

The above-mentioned (a), (b) and (c) features bring about the following effects: Firstly, by (a), the air-fuel mixture quality is improved for better ignitability and combustibility. Secondly, by (b), HC residing in the quenching layer is peeled off and unburned HC is reduced, and the rate of flame propagation is increased as well. Furthermore, a stable condition is obtained by item (c). Thus, the foregoing phenomena produce a synergistic effect and, as a result, the mixture is evenly burned, while unburned HC and $NO_x$ in exhaust gas are reduced, and the indicated specific fuel consumption is improved.

A further description of the reduction of $NO_x$ is given below: When an engine with unstable combustion is compared with an engine of stable combustion under which the same power output is obtainable, in the unstable engine the peak pressure and the peak temperature in the combustion chamber develop irregularly and repeatedly. Normally, generation of $NO_x$ increases in an accelerated fashion as the combustion temperature rises, so that repetition of the peak temperature greatly increases generation of $NO_x$. On the contrary, in the case of the stable engine, an average combustion temperature continues, so that low generation of $NO_x$ is achieved.

The engine embodying this invention has improved combustion, and therefore air-fuel mixture supplied by the carburetors may be greater than stoichiometric, whereby it is possible to further reduce the quantity of carbon monoxide in the exhaust gas.

Figure 5:
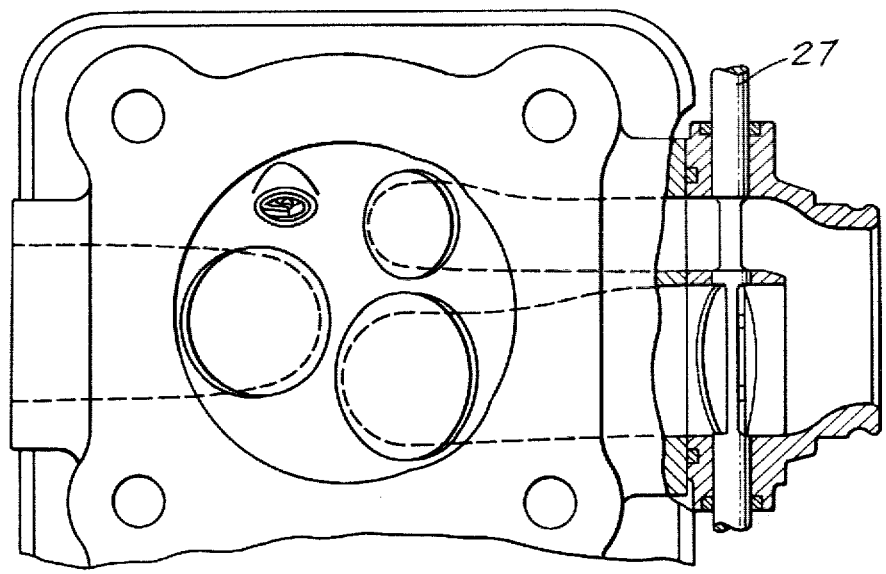
FIG. 5 is a bottom plan view showing a first modification.

Furthermore, when the effective cross-sectional areas of the first and second intake valve ports 16 and 17 are assumed to be $A_1$ and $A_2$, respectively, it is possible that $A_1$ may equal $A_2$, as shown in FIG. 1, for example, where it is conceivable that $A_1$ may be less than $A_2$, as shown in FIG. 5, whereby the intake rate of mixture introduced through the first intake valve port 16 is further increased for further improvement of combustion. In this case, it is preferable that $A_1$ is greater than one-half of $A_2$.

Furthermore, in the first modification when the amount of lift of the first intake valve 19 is assumed to be $H_1$ and the amount of lift of the second intake valve 20 is assumed to be $H_2$, $H_1$ less than $H_2$ is preferable, whereby the intake resistance of the second intake valve port 17 is reduced for improved volumetric efficiency in the range of high loads in particular.

Figure 4:
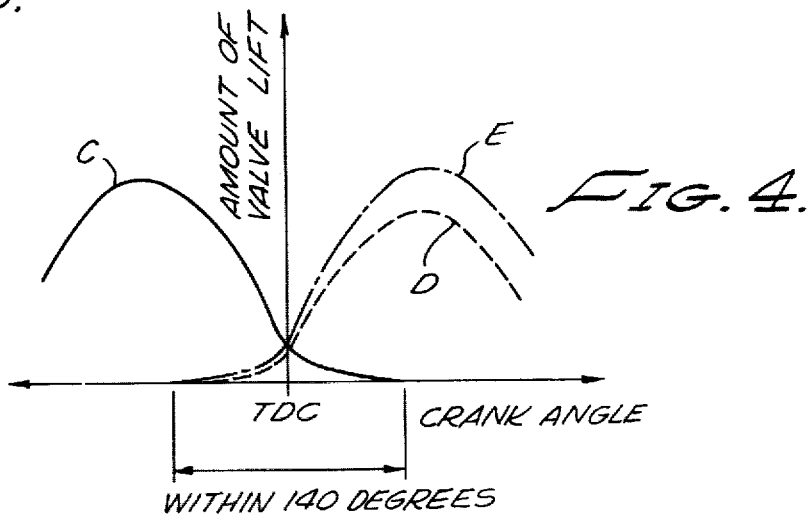
FIG. 4 is a diagram showing the overlap between the intake valves and the exhaust valve.

FIG. 4 shows a type of the relation of the overlap between the exhaust valve 18 and the first or second intake valve 19, 20. The curve "C" shows the operation characteristics of the exhaust valve 18, the curve "D" shows those of the first intake valve 19, and the curve "E" shows those of the second intake valve 20. It is preferable that the first intake valve 19 start opening before the top dead center at a time slightly later than that of the second intake valve 20, whereby the overlap between the first intake valve 19 and the exhaust valve 18 is small. The combustion particularly in the range of low loads is improved. In this case, it is preferable that the overlap be within 140 degrees of crank angle.

Figure 6:
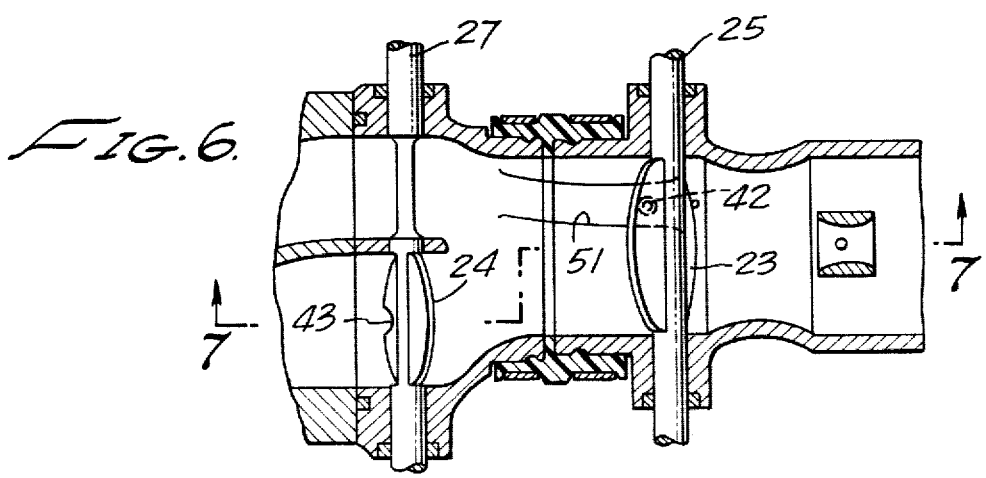
FIG. 6 is shows a second modification.
Figure 7:
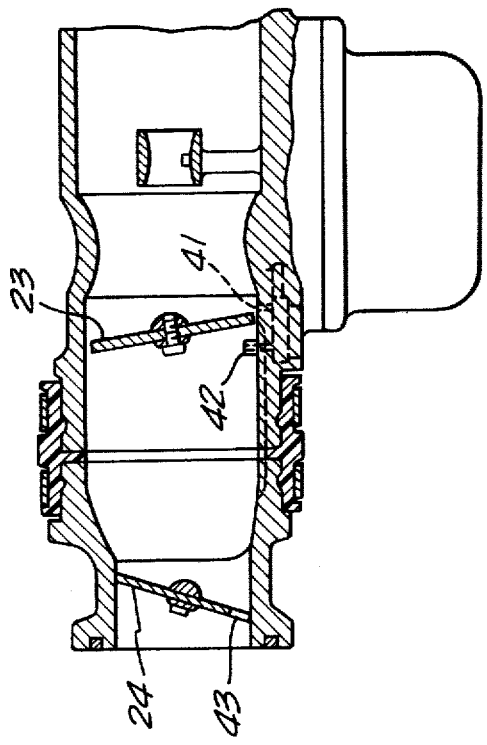
FIG. 7 is a sectional elevation taken substantially on the lines 7—7 as shown in FIG. 6.

In the modified form of the invention shown in FIGS. 6 and 7, a bypass port 41 for low speed fuel is provided, together with a pilot port 42. Also, the second throttle valve 24 is provided with a leak hole 43 to eliminate accumulation of undesirable deposits on the downstream side of the second throttle valve 24. The quantity of mixture flowing through the second intake port 17 is maintained to be not more than 30% of the minimum quantity of mixture flowing through the first intake port 16, so as not to disturb the swirl in the combustion chamber 14. A groove 51 is provided downstream the bypass port 41 so as to guide fuel from the bypass port to the first intake port 16.

Figure 8:
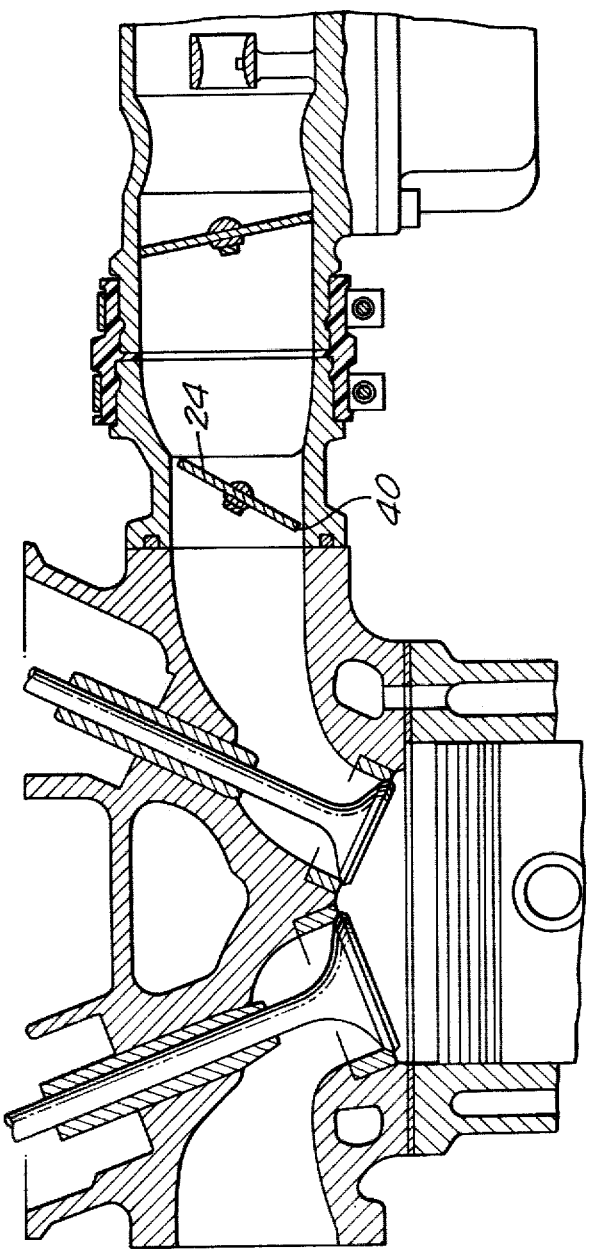
FIG. 8 is a sectional elevation showing a third modification.

In the form of the invention shown in FIG. 8, the second throttle valve 24 has peripheral clearance 40 even in its closed position.

Figure 9:
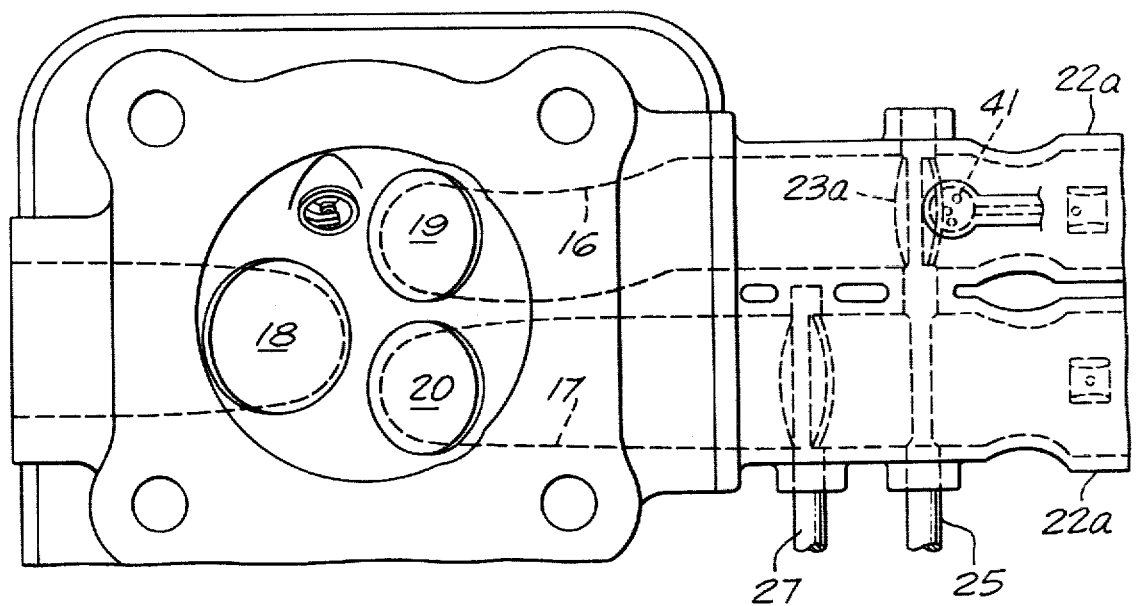
FIG. 9 is a bottom plan view showing a fourth modification.

In the modified form of the invention shown in FIG. 9. Two separate carburetors 22a are employed, one for each intake port 16, 17. The throttle shafts 25 and 27 are coordinated by linkage of the type shown in FIGS. 1 and 2.

Figure 10:
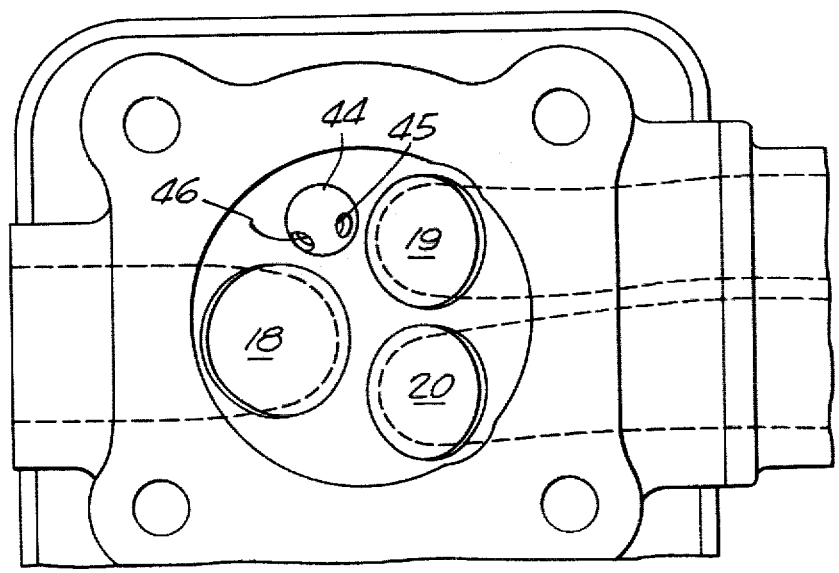
FIG. 10 is a bottom plan view showing a fifth modification.

In the modified form of the invention shown in FIGS. 10 and 11, the spark plug 37 has its electrodes positioned within an apertured cup 44 fixed in the cylinder head 13 and provided with openings 45 and 46. One of these openings 45 is directed toward the first intake valve 19 and the second opening 46 is directed toward the exhaust valve 18. The enclosure provided by the cup 44 reduces the speed of flow of air-fuel mixture past the spark plug electrodes and enables a stable ignition to take place. The flame nucleus rapidly reaches the exhaust valve 18 for accelerated growth.

In the modified form of the invention shown in FIG. 12, exhaust gas may be recirculated from the exhaust port 15 through exhaust recirculation passage 49 and control valve 50 into the second intake port 17 downstream from the second throttle valve 24.

In the multi-cylinder engine 10, it is preferable that each of the first intake ports 16 be in communication with the other intake ports 16, and this may be accomplished by a lateral communication hole 47 as shown in FIG. 2. In this way, any pressure variation between the intake port 16 can be eliminated. Furthermore, it is preferable that each of the first throttle valves 23 be aligned and that each of the second throttle valves 24 be aligned. This is accomplished by having a single shaft 25 for operating each of the first throttle valves 23 and a single shaft 27 for operating each of the throttle valves 24.

The engine block 48, cylinder head 13, and associated parts comprise one assembly, and the carburetors 22 comprise another. The two assemblies are connected by the non-metallic sleeve 33 and the tightening bands 34 and 35.

As seen from the foregoing, in accordance with the present invention, in the low load range of the engine particularly, the intake speed of the air-fuel mixture is increased to improve the mixture properties, and by virtue of the swirl, the flame propagation rate is improved and the unburned hydrocarbons in the quenching layer are peeled off. Furthermore, the high temperature at the exhaust valve portion produces a rapid growth in flame nucleus and, therefore, the air-fuel mixture is made to burn evenly as a whole. Unburned hydrocarbons and oxides of nitrogen in the exhaust gas are reduced, and fuel consumption is improved.

Having fully described our invention, it is to be understood that we are not to be limited to the details herein set forth but that our invention is of the full scope of the appended claims.

We claim:

1. In a high power output internal combustion engine having a piston mounted to reciprocate in a cylinder, the improvement comprising, in combination: a cylinder head cooperating with said cylinder and piston to form a combustion chamber, said combustion chamber having first and second intake ports and at least one exhaust port, a first intake valve for controlling flow through the first intake port, a second intake valve for controlling flow through the second intake port, an exhaust valve controlling flow through the exhaust port, said valves all being mounted in said cylinder head, said intake valves being positioned on one side of said combustion chamber and said exhaust valve being positioned on the other side, a spark plug communicating with said combustion chamber and positioned on the side with the exhaust valve and near said first intake valve, means for supplying air-fuel mixture to each of said intake ports, said means including a first throttle valve operated by an acceleration pedal and located upstream of both intake ports, a second throttle valve located downstream of said first throttle valve to control flow through said second intake port, whereby to define the quantity of air-fuel mixture flowing through said second intake port at a lower rate than that flowing through said first intake port, and means coordinating movement of said first and second throttle valves.

2. The combination set forth in claim 1 in which the effective cross-sectional area of said first intake port is less than the effective cross-sectional area of the second intake port but greater than one-half of the effective cross-sectional area of said second intake port.

3. The combination set forth in claim 1 in which the lift of the first intake valve is greater than the lift of the second intake valve.

4. The combination set forth in claim 1 in which said first and second throttle valves are in a lost motion connection with each other through linkage.

5. The combination set forth in claim 1 in which the second throttle valve has its upstream side and its downstream side in communication at all times.

6. The combination set forth in claim 5 in which the second throttle valve is slightly open even in its closed position.

7. The combination set forth in claim 5 in which said second throttle valve is provided with a leak hole communicating the upstream side with the downstream side.

8. The combination set forth in claim 1 in which a first carburetor is connected to supply said first intake port and a second carburetor is connected to supply the second intake port.

9. The combination set forth in claim 8 in which a bypass port for low speed fuel is provided with the first carburetor.

10. The combination set forth in claim 1 in which an exhaust gas recirculation passage connects the exhaust port to the second intake port, and a control valve in said passage.

11. The combination set forth in claim 1 in which the engine has a plurality of cylinders, the first intake port for each of the cylinders being connected by a communication tube.

12. The combination set forth in claim 1 in which a surrounding enclosure is provided for said spark plugs, the enclosure having an opening therein communicating with said combustion chamber.

13. The combination set forth in claim 12 in which the enclosure is provided with an opening oriented toward said exhaust valve.

14. In a high power output internal combustion engine having a piston mounted to reciprocate in a cylinder, the improvement comprising, in combination: a cylinder head cooperating with said cylinder and piston to form a combustion chamber, said combustion chamber having first and second intake ports and at least one exhaust port, a first intake valve for controlling flow through the first intake port, a second intake valve for controlling flow through the second intake port, an exhaust valve controlling flow through the exhaust port, said valves all being mounted in said cylinder head, said intake valves being positioned on one side of said combustion chamber and said exhaust valve being positioned on the other side, a spark plug communicating with said combustion chamber and positioned on the side with the exhaust valve and near said first intake valve, means for supplying air-fuel mixture to each of said intake ports, said means including a first throttle valve located upstream of both intake ports, a second throttle valve located downstream of said first throttle valve controlling flow through said second intake port, and means including a lost-motion connection coordinating movements of said throttle valves, whereby to define the quantity of air-fuel mixture flowing through said second intake port at a lower rate than that flowing through said first intake port.

* * * * *